US011027978B2

(12) United States Patent
Takano et al.

(10) Patent No.: US 11,027,978 B2
(45) Date of Patent: Jun. 8, 2021

(54) SILICON NANOPARTICLE-CONTAINING HYDROGEN POLYSILSESQUIOXANE, CALCINED PRODUCT THEREOF, PRODUCTION METHOD THEREFOR, ACTIVE MATERIAL, NEGATIVE ELECTRODE, AND LITHIUM ION BATTERY

(71) Applicants: JNC CORPORATION, Tokyo (JP); JNC PETROCHEMICAL CORPORATION, Tokyo (JP)

(72) Inventors: Yoshihito Takano, Chiba (JP); Tetsuro Kizaki, Chiba (JP); Hirotsuna Yamada, Chiba (JP); Masakazu Kondo, Chiba (JP); Akira Takahashi, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 102 days.

(21) Appl. No.: 16/313,866

(22) PCT Filed: Jan. 11, 2017

(86) PCT No.: PCT/JP2017/000691
§ 371 (c)(1),
(2) Date: Dec. 27, 2018

(87) PCT Pub. No.: WO2018/003150
PCT Pub. Date: Jan. 4, 2018

(65) Prior Publication Data
US 2019/0152787 A1    May 23, 2019

(30) Foreign Application Priority Data

Jun. 30, 2016  (JP) ............................. JP2016-129861
Sep. 12, 2016  (JP) ............................. JP2016-177641
Sep. 12, 2016  (JP) ............................. JP2016-177642

(51) Int. Cl.
*H01M 4/38* (2006.01)
*H01M 4/58* (2010.01)
(Continued)

(52) U.S. Cl.
CPC .............. *C01B 33/02* (2013.01); *C08G 77/12* (2013.01); *H01M 4/38* (2013.01); *H01M 4/382* (2013.01);
(Continued)

(58) Field of Classification Search
None
See application file for complete search history.

(56) References Cited

U.S. PATENT DOCUMENTS 7,833,662 B2 * 11/2010 Kim ...................... H01M 4/366
                                                          429/218.1
2010/0089451 A1 * 4/2010 Harimoto .............. C23C 18/122
                                                          136/261
(Continued)

FOREIGN PATENT DOCUMENTS

EP       3018099       * 11/2016 ............. C01B 31/30
JP     62-090863         4/1987
(Continued)

OTHER PUBLICATIONS

"International Search Report (Form PCT/ISA/210)" of PCT/JP2017/000691, dated Mar. 21, 2017, pp. 1-4.

*Primary Examiner* — Jonathan Crepeau
*Assistant Examiner* — Angela J Martin
(74) *Attorney, Agent, or Firm* — JCIPRNET

(57) ABSTRACT

A silicon nanoparticle-containing hydrogen polysilsesquioxane calcined product to be covered by the invention, represented by general formula $SiO_{x2}H_{y2}$ ($0.3<x2<1.5$, $0.01<y2<0.35$), containing 5% by weight to 65% by weight of silicon nanoparticles having a volume-basis mean particle (Continued)

size of more than 10 nanometers and less than 500 nanometers, having a chemical bond between a surface of the silicon nanoparticles and a silicon oxide structure derived from hydrogen polysilsesquioxane, having a Si—H bond, and substantially containing no carbon is silicon oxide applicable to a negative electrode active material for a secondary battery having excellent discharging capacity, initial charging and discharging efficiency and cycle characteristics.

14 Claims, 3 Drawing Sheets

(51) Int. Cl.
    *H01M 10/05*     (2010.01)
    *C01B 33/02*     (2006.01)
    *C08G 77/12*     (2006.01)
    *H01M 10/0525*     (2010.01)

(52) U.S. Cl.
    CPC ............. *H01M 4/386* (2013.01); *H01M 4/58* (2013.01); *H01M 10/0525* (2013.01)

(56) References Cited

U.S. PATENT DOCUMENTS

| | | | | |
|---|---|---|---|---|
| 2012/0295155 | A1* | 11/2012 | Deng | .................... H01M 4/136 |
| | | | | 429/200 |
| 2018/0212228 | A1* | 7/2018 | Iwatani | ................. H01M 4/621 |

FOREIGN PATENT DOCUMENTS

| | | | | |
|---|---|---|---|---|
| JP | 2004-071542 | | 3/2004 | |
| JP | 2008-171813 | | 7/2008 | |
| JP | 2008171813 | * | 7/2008 | .............. H01M 4/48 |
| JP | 2008545826 | | 12/2008 | |
| JP | 2010-272477 | | 12/2010 | |
| JP | 2016-031868 | | 3/2016 | |
| JP | 2016514898 | * | 5/2016 | .............. H01M 4/38 |
| KR | 20080064778 | * | 7/2008 | .......... H01M 10/052 |
| KR | 100851969 | * | 8/2008 | .......... H01M 4/485 |
| WO | 2014002602 | | 1/2014 | |
| WO | 2014027532 | | 2/2014 | |
| WO | WO 2016071462 | * | 5/2016 | ............. C01B 31/30 |
| WO | 2017010365 | | 1/2017 | |

\* cited by examiner

SILICON NANOPARTICLE-CONTAINING HYDROGEN POLYSILSESQUIOXANE, CALCINED PRODUCT THEREOF, PRODUCTION METHOD THEREFOR, ACTIVE MATERIAL, NEGATIVE ELECTRODE, AND LITHIUM ION BATTERY

CROSS-REFERENCE TO RELATED APPLICATION

This application is a 371 application of the International PCT application serial no. PCT/JP2017/000691, filed on Jan. 11, 2017, which claims the priority benefit of Japan Patent Application No. 2016-129861, filed on Jun. 30, 2016, Japan Patent Application No. 2016-177641, filed on Sep. 12, 2016, and Japan Patent Application No. 2016-177642, filed on Sep. 12, 2016. The entirety of each of the above-mentioned patent applications is hereby incorporated by reference herein and made a part of this specification.

TECHNICAL FIELD

The invention relates to silicon nanoparticle-containing hydrogen polysilsesquioxane having a chemical bond between a surface of silicon nanoparticles and hydrogen polysilsesquioxane, a silicon nanoparticle-containing hydrogen polysilsesquioxane calcined product, and a production method therefor. Furthermore, the invention relates to a negative electrode active material for a lithium ion battery, formed by containing the silicon nanoparticle-containing hydrogen polysilsesquioxane calcined product, a negative electrode for a lithium ion battery, formed by containing the negative electrode active material, and a lithium ion battery having the negative electrode for the lithium ion battery.

BACKGROUND ART

Various portable devices have been recently widely used in association with rapid evolution of electronic devices, communication devices and the like and development of size reduction technologies. Then, as a power supply of the above portable devices, from viewpoints of economic efficiency, size reduction and weight reduction of the device, development of a secondary battery having high capacity and excellent service-life characteristics is strongly desired.

As a small-sized, lightweight and high capacity secondary battery described above, development currently progresses on a rocking chair type lithium ion battery in which a lithium intercalation compound that releases a lithium ion from an interlayer is used as a positive electrode material, and a carbonaceous material typified by graphite and the like that can intercalate or deintercalate the lithium ion into or from the interlayer between crystal planes during charge and discharge is used as a negative electrode material, and the lithium ion battery has brought into practical use and generally used.

A nonaqueous electrolyte secondary battery in which a lithium compound is used as a negative electrode has high voltage and high energy density, and above all, lithium metal has been targeted for many researches as a negative electrode active material in an early stage by rich battery capacity thereof. However, when the lithium metal is used as the negative electrode, a large amount of dendritic lithium precipitates on a surface of negative electrode lithium during charge, and therefore charging and discharging efficiency is reduced, or the dendritic lithium grows to cause short circuiting with a positive electrode in several cases. In addition, the lithium metal itself is unstable, and has high reactivity, and is sensitive to heat and shock, and therefore a problem has remained in commercialization of the negative electrode using the lithium metal.

Then, as the negative electrode active material in place of the lithium metal, a carbon-based negative electrode that intercalates or deintercalates lithium has come to be used (Patent literature No. 1).

In the carbon-based negative electrode, various problems of the lithium metal have been solved, and the negative electrode has significantly contributed to wide use of the lithium ion battery. However, accordingly as size reduction, weight reduction and high performance of various portable devices are gradually achieved, achievement of the high capacity of the lithium ion battery has emerged as an important issue.

The lithium ion battery in which the carbon-based negative electrode is used has a porous structure of carbon, and therefore substantially has low battery capacity. For example, even in the case of graphite having the highest crystallinity as carbon used, theoretical capacity is about 372 mAh/g in a composition of $LiC_6$. The value is only about 10% in comparison with 3860 mAh/g as the theoretical capacity of the lithium metal. In view of such a situation, irrespective of the problem as described above, research has been actively attempted again on improving battery capacity by introducing metal such as lithium into the negative electrode.

As typical research, study has been conducted on use of a material containing, as a main component, metal that can be alloyed with lithium, such as Si, Sn and Al, as the negative electrode active material. However, in the material that can be alloyed with lithium, such as Si and Sn, fine powder of metal material particles is produced, involving volume expansion during an alloying reaction with lithium, and therefore contact among the metal material particles is reduced to produce an active material electrically isolated therefrom within the electrode in several cases. Further, the material has problems of causing elimination of the metal material particles from the electrode to increase internal resistance and reduce the capacity, resulting in reducing cycle performance, or increasing severity of an electrolyte decomposition reaction by specific surface area increase, or the like.

In order to solve the problem by use of such a metal material, study has advanced on using, as a material of the negative electrode active material, metal oxide having a relatively lower coefficient of volume expansion than the metal.

For example, Patent literature No. 2 discloses an art in which good charging and discharging cycle performance is obtained when silicon oxide containing silicon and oxygen and having a ratio of oxygen to silicon of 0 to 2 is used as the negative electrode active material of the lithium ion battery.

Moreover, Patent literature No. 3 proposes a method in which a calcined product of hydrogen polysilsesquioxane is used as a silicon oxide-based negative electrode active material containing amorphous silicon oxide including a nanopore structure.

Further, Patent literature No. 4 proposes silicon oxide capable of compensating a disadvantage of a coefficient of volume expansion during charge and discharge, and easily adjusting a ratio of oxygen to silicon by forming a structure in which a core containing silicon, and silicon nanoparticles formed on a surface of the core are arranged.

However, all the silicon oxide-based compounds in the Patent literature described above are a compound containing no hydrogen, and nothing is referred to presence of a Si—H bond. Accordingly, the silicon oxide-based compounds in the Patent literature described above are a compound substantially different from the silicon nanoparticle-containing hydrogen polysilsesquioxane calcined product represented by general formula $SiO_xH_y$ of the invention. Further, in the Patent literature described above, nothing is suggested on presence of a chemical bond between the silicon nanoparticles and the silicon oxide at all, and also in terms of the structure, the compounds are judged to be distinct from the silicon nanoparticle-containing hydrogen polysilsesquioxane calcined product of the invention. In addition, while a certain degree of improvement is recognized in battery performance upon using the compounds as a battery negative electrode active material, any one of discharging capacity, initial charging and discharging efficiency and a capacity maintenance rate in a charging and discharging cycle, or two or more performance reaches far from an acceptable level. Thus, the arts disclosed in the Patent literature are not a technique according to which the negative electrode active material exhibiting balanced battery performance and having high practicality can be provided.

CITATION LIST

Patent Literature

Patent literature No. 1: JP S62-90863 A
Patent literature No. 2: JP 2004-71542 A
Patent literature No. 3: JP 2008-171813 A
Patent literature No. 4: JP 2016-514898 A

SUMMARY OF INVENTION

Technical Problem

A problem of a conventional negative electrode material is still required to be solved, leading to development of a negative electrode active material providing a battery obtained with higher capacity to exhibit excellent initial discharging efficiency and excellent cycle performance.

An object of the invention is to provide a new silicon oxide-based structure as a negative electrode active material for a secondary battery, having high capacity to exhibit excellent initial charging and discharging efficiency, and simultaneously having good cycle performance and a practical capacity maintenance rate, which meets the demand.

Solution to Problem

The present inventors have diligently continued to conduct study toward solving the problem, and as a result, the present inventors have found a silicon nanoparticle-containing hydrogen polysilsesquioxane calcined product as a compound structure in which, upon being used as a negative electrode active material for a lithium ion battery, a secondary battery to be obtained has high capacity and excellent initial charging and discharging efficiency and an excellent capacity maintenance rate.

More specifically, the invention includes aspects described below.

Item 1. A silicon nanoparticle-containing hydrogen polysilsesquioxane calcined product, represented by general formula $SiO_{x2}H_{y2}$ (0.3<x2<1.5, 0.01<y2<0.35), containing 5% by weight to 65% by weight of silicon nanoparticles having a volume-basis mean particle size of more than 10 nanometers and less than 500 nanometers, having a chemical bond between a surface of the silicon nanoparticles and a silicon oxide structure derived from hydrogen polysilsesquioxane, having a Si—H bond, and substantially containing no carbon.

Item 2. The silicon nanoparticle-containing hydrogen polysilsesquioxane calcined product according to item 1, wherein, in a spectrum measured by infrared spectroscopy, a ratio ($I_1/I_2$) of intensity ($I_1$) of peak 1 in 820 to 920 $cm^{-1}$ arising from the Si—H bond to intensity ($I_2$) of peak 2 in 1000 to 1200 $cm^{-1}$ arising from a Si—O—Si bond is in the range of 0.01 to 0.35.

Item 3. The silicon nanoparticle-containing hydrogen polysilsesquioxane calcined product according to item 1 or 2, wherein, in a spectrum measured by infrared spectroscopy, among peaks arising from Si—O—Si, a ratio ($I_{2-1}/I_{2-2}$) of intensity ($I_{2-1}$) of a peak (peak 2-1) at about 1170 $cm^{-1}$ to intensity ($I_{2-2}$) of a peak (peak 2-2) at about 1070 $cm^{-1}$ more than 1. In addition, "at about 1170 $cm^{-1}$" of peak 1 herein means that peak 1 appears just at 1170 $cm^{-1}$, or in the range of 1170 $cm^{-1}$±5 $cm^{-1}$. In addition, peak 1 is a peak closest to 1170 $cm^{-1}$. A same rule applies also to peak 2, and "at about 1070 $cm^{-1}$" means that peak 2 appears just at 1070 $cm^{-1}$, or in the range of 1070 $cm^{-1}$±5 $cm^{-1}$ Then, peak 2 is a peak closest to 1070 $cm^{-1}$.

Item 4. A negative electrode active material for a lithium ion battery, containing the silicon nanoparticle-containing hydrogen polysilsesquioxane calcined product according to any one of items 1 to 3.

Item 5. A negative electrode for a lithium ion battery, containing the negative electrode active material for the lithium ion battery according to item 4.

Item 6. A lithium ion battery, having the negative electrode for the lithium ion battery according to item 5.

Item 7. A production method for a silicon nanoparticle-containing hydrogen polysilsesquioxane calcined product, represented by general formula $SiO_{x2}H_{y2}$ (0.3<x2<1.5, 0.01<y2<0.35), containing 5% by weight to 65% by weight of silicon nanoparticles having a volume-basis mean particle size of more than 10 nanometers and less than 500 nanometers, having a chemical bond between a surface of the silicon nanoparticles and a silicon oxide structure derived from hydrogen polysilsesquioxane, having a Si—H bond, and substantially containing no carbon, and including a step of calcining silicon nanoparticle-containing hydrogen polysilsesquioxane, represented by general formula $SiO_{x1}H_{y1}$ (0.25<x1<1.35, 0.16<y1<0.90), containing 5% by weight to 65% by weight of silicon nanoparticles having a volume-basis mean particle size of more than 10 nanometers and less than 500 nanometers, and having a chemical bond between a surface of the silicon nanoparticles and hydrogen polysilsesquioxane.

Item 8. The production method according to item 7, wherein, in a spectrum measured by infrared spectroscopy, a ratio ($I_1/I_2$) of intensity ($I_1$) of peak 1 in 820 to 920 $cm^{-1}$ arising from the Si—H bond to intensity ($I_2$) of peak 2 in 1000 to 1200 $cm^{-1}$ arising from a Si—O—Si bond is in the range of 0.01 to 0.35.

Item 9. The production method according to item 7 or 8, wherein, in a spectrum measured by infrared spectroscopy, among peaks arising from Si—O—Si, a ratio ($I_{2-1}/I_{2-2}$) of intensity ($I_{2-1}$) of a peak (peak 2-1) at about 1170 $cm^{-1}$ to intensity ($I_{2-2}$) of a peak (peak 2-2) at about 1070 $cm^{-1}$ is more than 1.

Item 10. The production method according to anyone of items 7 to 9, wherein the calcination is performed at a temperature of 600° C. to 900° C. under a non-oxidizing atmosphere.

Item 11. The production method according to item 10, wherein the non-oxidizing atmosphere is a hydrogen gas atmosphere, or a mixed gas atmosphere of 2% by volume or more of a hydrogen gas and an inert gas.

Item 12. A silicon nanoparticle-containing hydrogen polysilsesquioxane, represented by general formula $SiO_{x1}H_{y1}$ ($0.25<x1<1.35$, $0.16<y1<0.90$), containing 5% by weight to 65% by weight of silicon nanoparticles having a volume-basis mean particle size of more than 10 nanometers and less than 500 nanometers, and having a chemical bond between a surface of the silicon nanoparticles and hydrogen polysilsesquioxane.

Item 13. The silicon nanoparticle-containing hydrogen polysilsesquioxane according to item 12, wherein, in a spectrum measured by infrared spectroscopy, among peaks arising from Si—O—Si, a ratio ($I_{2-1}/I_{2-2}$) of intensity ($I_{2-1}$) of a peak (peak 2-1) at about 1170 cm$^{-1}$ to intensity ($I_{2-2}$) of a peak (peak 2-2) at about 1070 cm$^{-1}$ is more than 1.

Item 14. A production method for silicon nanoparticle-containing hydrogen polysilsesquioxane, represented by general formula $SiO_{x1}H_{y1}$ ($0.25<x1<1.35$, $0.16<y1<0.90$), containing 5% by weight to 65% by weight of silicon nanoparticles having a volume-basis mean particle size of more than 10 nanometers and less than 500 nanometers, and having a chemical bond between a surface of the silicon nanoparticles and hydrogen polysilsesquioxane, and including a step of allowing hydrolysis and a condensation reaction (also referred to as a polycondensation reaction) of a silicon compound represented by formula (1) in the presence of silicon nanoparticles:

wherein, R is halogen, hydrogen or a group selected from substituted or unsubstituted alkoxy having 1 to 10 carbons, substituted or unsubstituted aryloxy having 6 to 20 carbons, and substituted or unsubstituted arylalkoxy having 7 to 30 carbons, which is identical with or different from each other, in which, in the substituted or unsubstituted alkoxy having 1 to 10 carbons, the substituted or unsubstituted aryloxy having 6 to 20 carbons, and the substituted or unsubstituted arylalkoxy having 7 to 30 carbons, arbitrary hydrogen may be replaced by halogen.

Advantageous Effects of Invention

The invention can provide a negative electrode active material containing a silicon nanoparticle-containing hydrogen polysilsesquioxane calcined product having a new structure to be directly obtained from a calcined product obtained by heat-treating silicon nanoparticle-containing hydrogen polysilsesquioxane under a non-oxidizing atmosphere.

Moreover, a lithium ion battery obtained by using the negative electrode active material for the lithium ion battery according to the invention has excellent discharging capacity, excellent initial discharging efficiency and good cycle performance.

DESCRIPTION OF EMBODIMENTS

Figure 1:
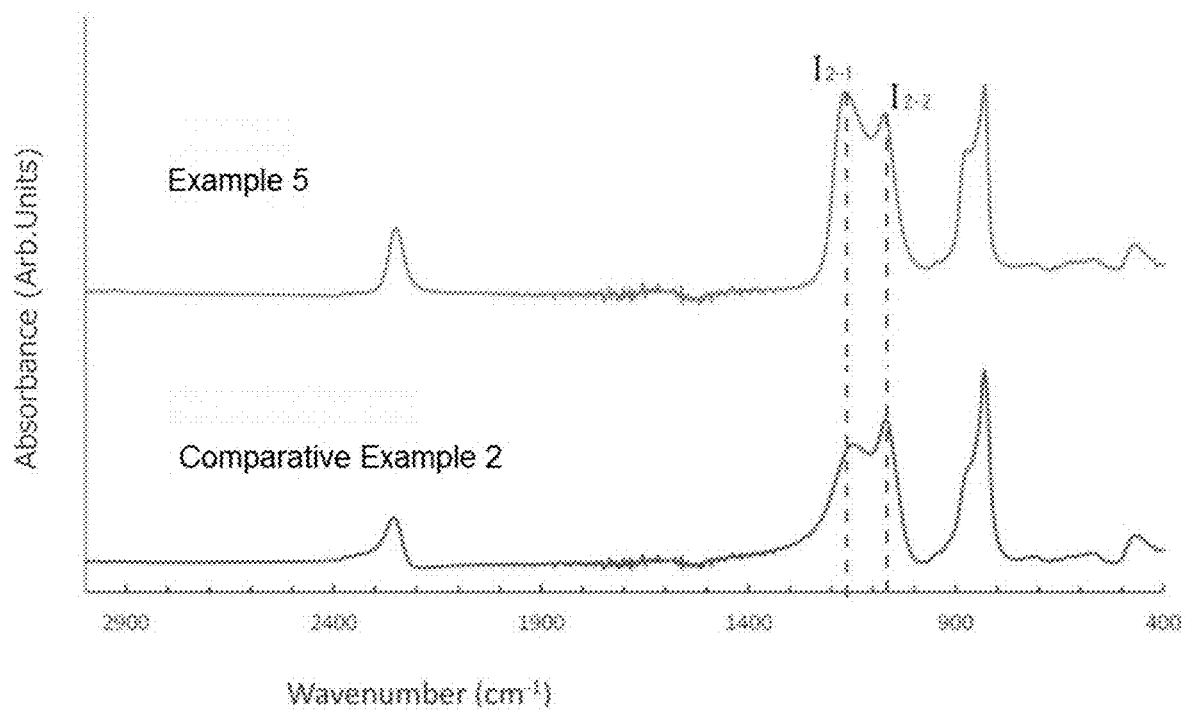
FIG. 1 is a chart of an IR absorption spectrum of silicon nanoparticle-containing hydrogen polysilsesquioxane (3) produced in Example 5 and hydrogen silsesquioxane polymer (1) produced in Comparative Example 2, by infrared spectroscopy (IR).

Hereinafter, the invention will be described in more detail.
Production of Silicon Nanoparticle-Containing Hydrogen Polysilsesquioxane Silicon nanoparticle-containing hydrogen polysilsesquioxane of the invention can be obtained by mixing silicon nanoparticles in a process of allowing hydrolysis and a condensation reaction of a silicon compound represented by formula (1) to synthesize a hydrogen silsesquioxane polymer (HPSQ), but a method is not particularly limited thereto. Specific examples include a method of allowing hydrolysis and a condensation reaction of a mixture obtained by adding silicon nanopowder to a silicon compound represented by formula (1), or a method of adding dropwise a silicon compound represented by formula (1) into a solvent in which silicon nanopowder is dispersed to allow hydrolysis and a condensation reaction of the resulting solution.

In formula (1), R is halogen, hydrogen or a group selected from substituted or unsubstituted alkoxy having 1 to 10 carbons, and substituted or unsubstituted aryloxy having 6 to 20 carbons, which is identical with or different from each other, in which, in the substituted or unsubstituted alkoxy having 1 to 10 carbons, and the substituted or unsubstituted aryloxy having 6 to 20 carbons, arbitrary hydrogen may be replaced by halogen.

Specific examples of the silicon compound represented by formula (1) include compounds described below. Examples include trihalogenated silane or dihalogenated silane, such as trichlorosilane, trifluorosilane, tribromosilane and dichlorosilane; trialkoxysilane or dialkoxysilane, such as tri-n-butoxysilane, tri-t-butoxysilane, tri-n-propoxysilane, tri-i-propoxysilane, di-n-butoxyethoxysilane, triethoxysilane, trimethoxysilane and diethoxysilane; and aryloxysilane or aryloxyalkoxysilane, such as triaryloxysilane, diaryloxysilane and diaryloxyethoxysilane.

Among the above compounds, from viewpoints of reactivity and ease of availability, and a production cost, trihalogenated silane or trialkoxysilane is preferred, and trihalogenated silane is particularly preferred.

The silicon compounds represented by formula (1) may be used alone, or two or more kinds may be mixed and used.

Moreover, the silicon compound represented by formula (1) has high hydrolyzability and condensation reactivity, and the silicon nanoparticle-containing hydrogen polysilsesquioxane of the invention can be easily obtained by using the silicon compound. In addition, use of the silicon compound represented by formula (1) also has an advantage of facilitating to control an amount of Si—H bond in the silicon nanoparticle-containing hydrogen polysilsesquioxane calcined product to be obtained in heat-treating, under a non-oxidizing atmosphere, the silicon nanoparticle-containing hydrogen polysilsesquioxane obtained.

Next, the hydrolysis and a polycondensation reaction of the mixture obtained by adding the silicon nanoparticles to the silicon compound represented by formula (1) will be described.

The hydrolysis can be performed by a publicly-known method, for example, in a solvent such as alcohol or DMF, in the presence of inorganic acid such as hydrochloric acid, or organic acid such as acetic acid, and water, at ordinary temperature or under heating. Accordingly, a reaction mixture after the hydrolysis may contain therein, in addition to a hydrolysate of the silicon compound represented by formula (1), the solvent, the acid and water, and a material derived therefrom.

Moreover, in the reaction mixture after the hydrolysis, the silicon compound represented by formula (1) need not be completely hydrolyzed, and part thereof may remain.

In addition, the polycondensation reaction of the hydrolysate also partially progresses in addition to a hydrolysis reaction.

Here, a degree at which the polycondensation reaction progresses can be controlled by a hydrolysis temperature, a hydrolysis time, acidity and/or a solvent, or the like, and for example, can be appropriately set according to intended silicon nanoparticle-containing hydrogen polysilsesquioxane as described later.

In the invention, a method in which the hydrolysis and the condensation reaction are concurrently carried out under identical conditions in one reactor is preferred in consideration of productivity and the production cost thereof.

As reaction conditions, the silicon compound represented by formula (1) is added to an acidic aqueous solution under stirring, and is allowed to react at a temperature of −20° C. to 50° C., preferably 0° C. to 40° C., and particularly preferably 10° C. to 30° C., for 0.5 hour to 20 hours, preferably for 1 hour to 10 hours, and particularly preferably for 1 hour to 5 hours.

Acidity of a hydrolyzed solution is preferably adjusted ordinarily to pH 7 or less, and further preferably to pH 6 or less, and still further preferably pH 3 or less. As the acid used for pH adjustment, any of the organic acid and the inorganic acid can be used.

Specific examples of the organic acid include formic acid, acetic acid, propionic acid, oxalic acid and citric acid, and specific examples of the inorganic acid include hydrochloric acid, sulfuric acid, nitric acid and phosphoric acid. Among the above acids, hydrochloric acid and acetic acid are preferred in view of capability of easily controlling the hydrolysis reaction and the subsequent polycondensation reaction, and ease of availability, the pH adjustment and treatment after the reaction.

Moreover, when halogenated silane such as trichlorosilane is used as the silicon compound represented by formula (1), the acidic aqueous solution is formed in the presence of water, and therefore acid needs not to be particularly added separately, which is one of preferred aspects of the invention.

Silicon nanoparticle-containing hydrogen polysilsesquioxane (a precursor of the silicon nanoparticle-containing hydrogen polysilsesquioxane calcined product) can be obtained by carrying out the hydrolysis reaction and the polycondensation reaction of the compound represented by formula (1) in the coexistence of the silicon nanoparticles. The silicon nanoparticles to be used are not particularly limited as long as a volume-basis mean particle size thereof is more than 10 nanometers and less than 500 nanometers. A preferred volume-basis mean particle size is more than 30 nanometers and less than 200 nanometers. In addition, as the silicon nanoparticles, silicon nanopowder or the like is preferably used. In addition, the volume-basis mean particle size herein means a particle size calculated by a volume basis, and may be occasionally referred to simply as a mean particle size. In addition, the silicon nanoparticles may contain any other component other than silicon in the range in which advantageous effects of the invention are not adversely affected, and can contain metals, for example, and a content thereof is ordinarily less than 5% by weight based on the silicon nanoparticles.

The silicon nanoparticles are ordinarily blended to be 5% by weight to 65% by weight (more specifically, 5% by weight or more and 65% by weight or less) based on silicon nanoparticle-containing hydrogen polysilsesquioxane to be obtained. The content is preferably 10% by weight to 60% by weight (more specifically, 10% by weight or more and 60% by weight or less). If the content is 5% by weight or more, when a calcined product thereof is used as a negative electrode active material for a lithium ion battery, initial charging and discharging efficiency is high, and an effect of complexing with the silicon nanoparticles can be sufficiently obtained. If the content is 65% or less, when the calcined product is used as the negative electrode active material for the lithium ion battery, an expansion and contraction rate of the negative electrode active material by charge and discharge is not increased by stress relaxation of complexed hydrogen silsesquioxane, and a capacity maintenance rate is sufficiently held.

After completion of the hydrolysis reaction and the polycondensation reaction, a liquid fraction is separated and removed by a publicly known method such as filtration and separation, centrifugal separation or decantation, and in several cases, the resulting material is further washed with water or an organic solvent, and then dried, and thus silicon nanoparticle-containing hydrogen polysilsesquioxane of the invention can be obtained.

Structure of Silicon Nanoparticle-Containing Hydrogen Polysilsesquioxane

According to measurement by elemental analysis, a composition of silicon nanoparticle-containing hydrogen polysilsesquioxane of the invention includes silicon (Si), oxygen (O) and hydrogen (H), and is represented by general formula $SiO_{x1}H_{y1}$ ($0.25<x1<1.35$, $0.16<y1<0.90$). Silicon nanoparticle-containing hydrogen polysilsesquioxane of the invention substantially contains no carbon.

If x1 is in the range of $0.25<x1<1.35$, and is preferably in the range of $0.28<x1<1.3$ in the general formula, such silicon nanoparticle-containing hydrogen polysilsesquioxane is calcined, thereby being able to obtain a calcined material (negative electrode active material) having sufficient battery capacity, and excellent charging and discharging characteristics in which the initial charging and discharging efficiency and the cycle capacity maintenance rate are balanced. If y1 is in the range of $0.16<y1<0.90$, and preferably in the range of $0.16<y1<0.86$, a secondary battery to be obtained by using the calcined product of silicon nanoparticle-containing hydrogen polysilsesquioxane has excellent charging and discharging capacity, and good cycle performance in which the capacity maintenance rate is improved.

Further, silicon nanoparticle-containing hydrogen polysilsesquioxane of the invention has features in which, in a spectrum measured by infrared spectroscopy, among peaks arising from a Si—O—Si bond, a ratio ($I_{2-1}/I_{2-2}$) of intensity ($I_{2-1}$) of peak 2-1 at about 1170 cm$^{-1}$ to intensity ($I_{2-2}$) of peak 2-2 at about 1070 cm$^{-1}$ is more than 1. The peak intensity ratio of more than 1 suggests that the calcined product has a chemical bond between the silicon nanoparticles and hydrogen polysilsesquioxane existing therein, and particle disintegration caused by expansion and contraction of the silicon particles during a charging and discharging cycle is estimated to be suppressed by presence of the chemical bond.

An absorption band in 1000 to 1200 cm$^{-1}$ in an IR spectrum of hydrogen polysilsesquioxane arises from asymmetric stretching vibration of the Si—O—Si bond, and in the case of a straight-chain bond, two peaks of absorption are generally observed in 1000 to 1200 cm$^{-1}$, and in the case of a cyclic bond, one peak of absorption is generally observed in 1000 to 1100 cm$^{-1}$. In the IR spectrum of silicon nanoparticle-containing hydrogen polysilsesquioxane, absorption peak 2-1 at about 1170 cm$^{-1}$ is attributed to arise from the straight-chain bond of siloxane, and absorption peak 2-2 at about 1070 cm$^{-1}$ is attributed to arise from both the straight-chain bond and the cyclic bond of siloxane. When the silicon compound represented by formula (1) is subjected to the hydrolysis and the condensation reaction alone without coexistence of the silicon nanoparticles, energy of a system is presumed to be further reduced in a reaction in which polymer terminals react with each other, thereby forming cyclic siloxane than in a reaction in which a polymer terminal reacts with a monomer, thereby forming straight-chain cyclic siloxane. Accordingly, peak 2-2 becoming larger than peak 2-1 can be easily predicted.

Meanwhile, the hydrolysis-polymerization of the silicon compound represented by formula (1) is progressed in the coexistence of the silicon nanoparticles of the invention, and therefore if a terminal portion of a chain Si—O—Si skeleton included in the HPSQ polymer to be formed reacts with a silanol skeleton on a surface of the silicon nanoparticles, the polymerization is terminated there, and a chain Si—O—Si structure is to be held. As a result, formation of a cyclic Si—O—Si skeleton is conceivably suppressed in comparison with a case where the silicon compound represented by formula (1) is allowed to react alone. Further, with regard to the above ratio, a proportion of a cyclized bond is generally maintained even after heat treatment, and therefore a state of $I_{2-1}/I_{2-2}>1$ is also maintained even after calcination.

Thus, in silicon nanoparticle-containing hydrogen polysilsesquioxane of the invention, the silicon nanoparticles and hydrogen polysilsesquioxane form a network through a strong chemical bond (Si—O—Si bond). The network is held even after the calcination, a hydrogen polysilsesquioxane skeleton plays a role of a buffer layer against expansion and contraction of the silicon nanoparticles, and as a result, micronization of the silicon nanoparticles caused during repetition of charge and discharge is estimated to be suppressed.

Figure 2:
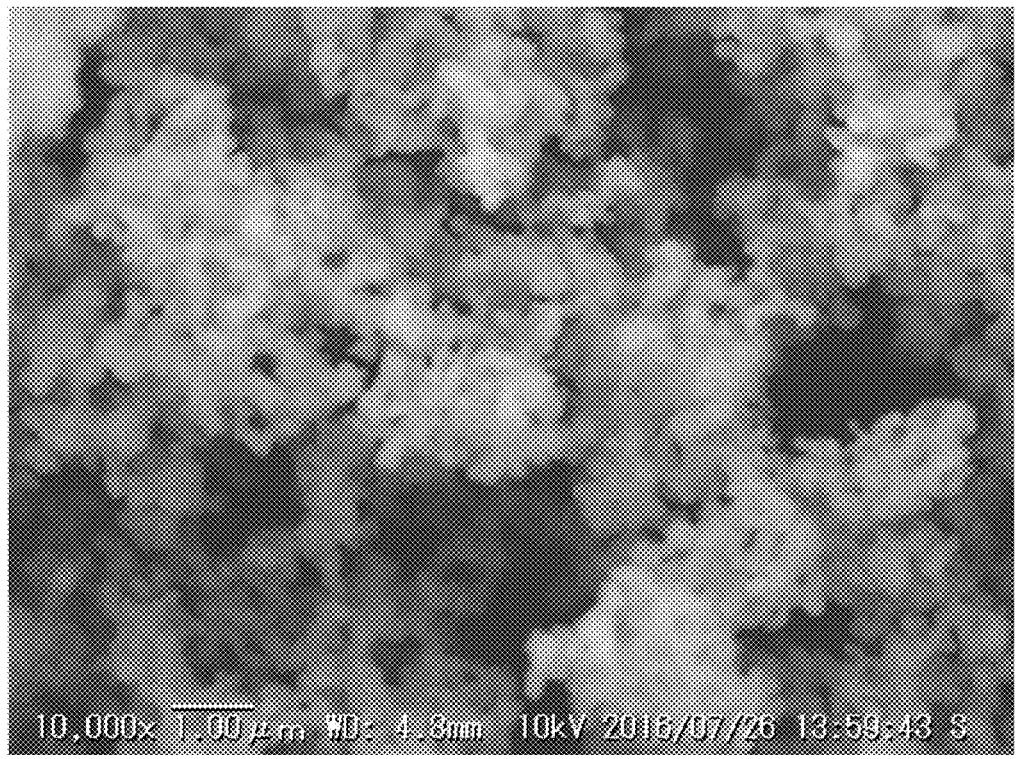
FIG. 2 shows a scanning electron microscope (SEM) photograph of silicon nanoparticle-containing hydrogen polysilsesquioxane (3) produced in Example 5.

Silicon nanoparticle-containing hydrogen polysilsesquioxane thus obtained forms a secondary aggregate having a particle size of several microns in which primary particles being spherical particles having a particle size of a submicron are further aggregated, as is obvious in a scanning electron microscope (SEM) photograph shown in FIG. 2.

The primary particles are small, and therefore when the calcined product of silicon nanoparticle-containing hydrogen polysilsesquioxane is used in a battery as the negative electrode material for the lithium ion battery, stress during expansion and contraction caused during repetition of charge and discharge is relaxed. Accordingly, cycle deterioration is suppressed to be effective in improving cycle performance. Moreover, the silicon nanoparticle-containing hydrogen polysilsesquioxane has a complicated secondary aggregation structure, resulting in favorable binding properties with a binder to develop further excellent cycle performance.

Next, the silicon nanoparticle-containing hydrogen polysilsesquioxane calcined product obtained by calcining silicon nanoparticle-containing hydrogen polysilsesquioxane will be described.

Production of Silicon Nanoparticle-Containing Hydrogen Polysilsesquioxane Calcined Product The silicon nanoparticle-containing hydrogen polysilsesquioxane calcined product is obtained by heat-treating silicon nanoparticle-containing hydrogen polysilsesquioxane obtained under the non-oxidizing atmosphere by the method described above. "Non-oxidizing" herein means that no oxygen is substantially contained literally, but formation of silicon dioxide only needs to be substantially suppressed to a degree at which the advantageous effects of the invention are not adversely affected upon heat-treating the silicon nanoparticle-containing hydrogen polysilsesquioxane (more specifically, a value of $I_1/I_2$ may be adjusted within a numerical range specified in the invention). Accordingly, with regard to "non-oxidizing," oxygen only needs to be removed so as to achieve the object. Here, $I_1$ means intensity ($I_1$) of peak 1 in 820 to 920 cm$^{-1}$ arising from the Si—H bond. When a composition of the silicon nanoparticle-containing hydrogen polysilsesquioxane calcined product thus obtained is measured by elemental analysis, the silicon nanoparticle-containing hydrogen polysilsesquioxane calcined product contains silicon (Si), oxygen (O) and hydrogen (H), is represented by general formula $SiO_{x2}H_{y2}$ ($0.3<x2<1.5$, $0.01<y2<0.35$), and substantially contains no carbon.

If x2 is in the range of $0.3<x2<1.5$, and preferably in the range of $0.4<x2<1.0$ in the calcined product, the negative electrode active material having the sufficient battery capacity, and the excellent charging and discharging characteristics in which the initial charging and discharging efficiency and the cycle capacity maintenance rate are balanced can be obtained. If y2 is in the range of $0.01<y2<0.35$, and preferably in the range of $0.02<y2<0.3$ in the calcined product, the secondary battery to be obtained has the excellent discharging capacity, and the good cycle performance in which the capacity maintenance rate is improved.

Further, with regard to the silicon nanoparticle-containing hydrogen polysilsesquioxane calcined product, in the spectrum measured by infrared spectroscopy, a ratio ($I_1/I_2$) of intensity ($I_1$) of peak 1 in 820 to 920 cm$^{-1}$ arising from the Si—H bond to intensity ($I_2$) of peak 2 in 1000 to 1200 cm$^{-1}$ arising from the Si—O—Si bond is preferably in the range of 0.01 to 0.35.

If the ratio ($I_1/I_2$) of intensity ($I_1$) of peak 1 to intensity ($I_2$) of peak 2 is preferably in the range of 0.01 to 0.35, further preferably in the range of 0.01 to 0.30, and still further preferably in the range of 0.03 to 0.20, when the calcined product is used as the negative electrode active material for the lithium ion battery, the high discharging capacity and good initial charging and discharging efficiency and the cycle performance can be developed by presence of a suitable amount of Si—H bond.

Further, with regard to the silicon nanoparticle-containing hydrogen polysilsesquioxane calcined product, in the spectrum measured by infrared spectroscopy, among peaks arising from Si—O—Si, the ratio ($I_{2-1}/I_{2-2}$) of intensity ($I_{2-1}$) of peak 2-1 at about 1170 cm$^{-1}$ to intensity ($I_{2-2}$) of peak 2-2 at about 1070 cm$^{-1}$ is preferably more than 1. The peak intensity ratio of more than 1 suggests that the calcined product has a chemical bond between the silicon nanoparticles existing inside the silicon nanoparticle-containing hydrogen polysilsesquioxane calcined product and a silicon oxide structure derived from hydrogen polysilsesquioxane, and the particle disintegration caused by expansion and contraction of the silicon particles during the charging and discharging cycle is estimated to be suppressed by presence of the chemical bond.

As described above, the heat treatment of silicon nanoparticle-containing hydrogen polysilsesquioxane is preferably carried out under the non-oxidizing atmosphere. If the heat treatment is carried out in an atmosphere in which oxygen exists, silicon dioxide is formed, thereby being unable to obtain a desired composition and Si—H bonding amount.

The non-oxidizing atmosphere includes an inert gas atmosphere, an atmosphere in which oxygen is removed by high vacuum (only needs to be the atmosphere in which oxygen is removed to a degree not inhibiting formation of the objective silicon nanoparticle-containing hydrogen polysilsesquioxane calcined product), a reducible atmosphere and an atmosphere combining the above atmospheres. Specific examples of the inert gas include nitrogen, argon and helium. The above inert gases can be used without any problem if the inert gas is in a high purity specification generally used. Moreover, an atmosphere in which oxygen is removed by high vacuum without using the inert gas may be applied. The reducible atmosphere includes an atmosphere containing a reducible gas such as hydrogen. Specific examples include a mixed gas atmosphere of 2% by volume or more of a hydrogen gas and an inert gas. In addition, as the reducible gas, a hydrogen gas atmosphere can also be used.

In the invention, silicon nanoparticle-containing hydrogen polysilsesquioxane is heat-treated under the non-oxidizing atmosphere, thereby causing start of dehydrogenation of the Si—H bond from about 600° C. to form a Si—Si bond, and a characteristic silicon oxide structure derived from hydrogen polysilsesquioxane is formed. Even if the above heat treatment is carried out, the chemical bond between the silicon nanoparticles and hydrogen polysilsesquioxane is held. Presence of the silicon oxide structure derived from hydrogen polysilsesquioxane after the heat treatment can be known by measurement by the infrared spectroscopy described later, or the like. If the Si—Si bond is moderately grown, the Si—Si bond is formed into an excellent Li intercalation site to serve as a source of high charging capacity. Meanwhile, the Si—H bond interacts with a binder having a functional group such as a COO$^-$ group, being a publicly-known battery material component, to form a flexible and strong bond, and therefore when the battery is formed therefrom, the good cycle performance is developed.

Accordingly, a suitable amount of Si—H bond is required to remain in order to develop both high capacity and the good cycle performance, and a heat treatment temperature satisfying such conditions is ordinarily 600° C. to 1000° C., and preferably 750° C. to 900° C. If the temperature is less than 600° C., the amount of Si—H bond is excessively large, and the discharging capacity is not sufficient, and if the temperature is more than 1000° C., the Si—H bonds are lost, and therefore the good cycle performance is unable to be obtained. Further, a strong SiO$_2$ layer is developed on the surface to inhibit insertion and elimination of lithium, and therefore the capacity becomes hard to be developed.

A heat treatment time is not particularly limited, but is ordinarily 30 minutes to 10 hours, and preferably 1 to 8 hours.

The silicon nanoparticle-containing hydrogen polysilsesquioxane calcined product is obtained by the heat treatment described above, in which heat treatment conditions only need to be appropriately selected to fall within the range of SiO$_{x2}$H$_{y2}$ (0.3<x2<1.5, 0.01<y2<0.35) in results of the elemental analysis already described, and within the range of 0.01 to 0.35 in the ratio ($I_1/I_2$) of intensity ($I_1$) of peak 1 to intensity ($I_2$) of peak 2 by the infrared spectroscopy.

Figure 4:
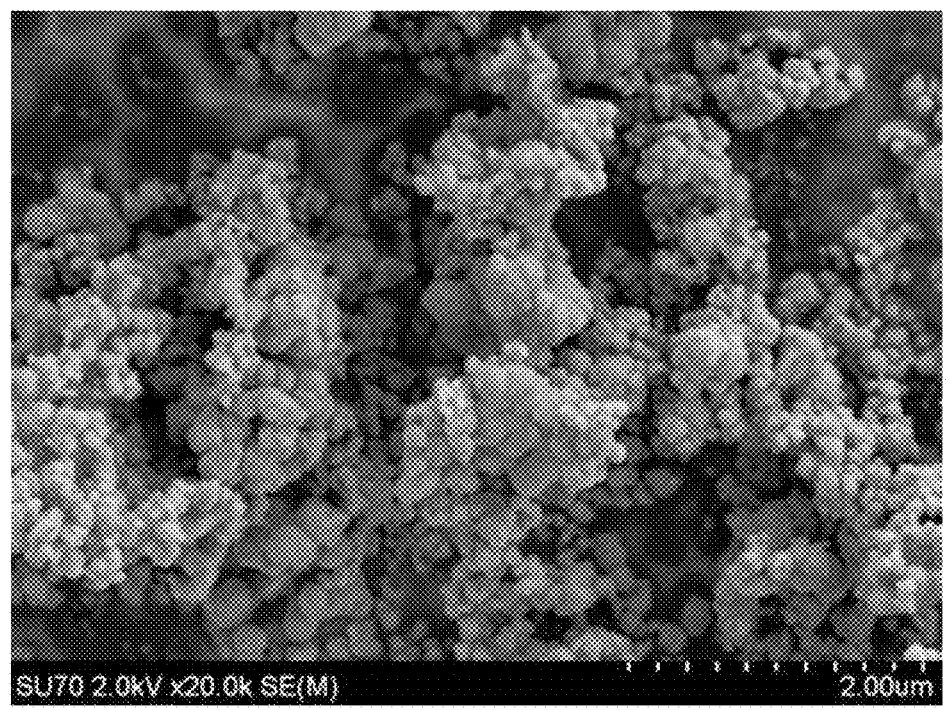
FIG. 4 shows a scanning electron microscope (SEM) photograph of silicon nanoparticle-containing hydrogen polysilsesquioxane (5) produced in Example 10.

The thus obtained silicon nanoparticle-containing hydrogen polysilsesquioxane calcined product of the invention is obtained by heat-treating silicon nanoparticle-containing hydrogen polysilsesquioxane obtained by the synthetic method of the invention as a shape thereof, and therefore as is obvious in a scanning electron microscope (SEM) photograph shown in FIG. 4, primary particles being spherical particles having a particle size of submicron order are further aggregated to form a secondary aggregate having a particle size of several microns.

The primary particles are small, and therefore when the calcined product is used for the battery as the negative electrode material for the lithium ion battery, stress during expansion and contraction caused upon repeating charge and discharge is relaxed. Accordingly, cycle deterioration is suppressed to be effective in improving the cycle performance. Moreover, the calcined product has a complicated secondary aggregation structure, resulting in favorable binding properties with the binder to develop further excellent cycle performance.

Negative Electrode Active Material Containing a Silicon Nanoparticle-Containing Hydrogen Polysilsesquioxane Calcined Product Next, the negative electrode active material for the lithium ion battery, formed by containing the silicon nanoparticle-containing hydrogen polysilsesquioxane calcined product, will be described.

In the battery, a large amount of current is essential to be charged and discharged for achieving the high capacity, and therefore a demand is expressed for a material having low electric resistance in an electrode.

Accordingly, an art of complexing or coating a carbon-based material with the silicon nanoparticle-containing hydrogen polysilsesquioxane calcined product is also one aspect of the invention.

In order to complex or coat the carbon-based material with the calcined product, specific examples include a method of dispersing the silicon nanoparticle-containing hydrogen polysilsesquioxane calcined product and the carbon-based material by mechanofusion or a mechanical mixing method using a ball mill, a vibrating mill or the like.

Specific examples of the carbon-based material preferably include a carbon-based material such as graphite, carbon black, fullerene, a carbon nanotube, a carbon nanofoam, pitch-based carbon fibers, polyacrylonitrile-based carbon fibers and amorphous carbon.

In addition, the silicon nanoparticle-containing hydrogen polysilsesquioxane calcined product can be complexed or coated with the carbon-based material at an arbitrary proportion.

Negative Electrode

The negative electrode in the lithium ion secondary battery according to the invention is produced by using the negative electrode active material containing the silicon nanoparticle-containing hydrogen polysilsesquioxane calcined product or the silicon nanoparticle-containing hydrogen polysilsesquioxane calcined product complexed or coated with the carbon-based material.

For example, a negative electrode mixed material containing the binder, and the negative electrode active material formed by containing the silicon nanoparticle-containing hydrogen polysilsesquioxane calcined product or the silicon nanoparticle-containing hydrogen polysilsesquioxane calcined product complexed or coated with the carbon-based material may be shaped into a predetermined form, or the negative electrode may be produced by a method of applying the negative electrode mixed material to a collector such as copper foil. A method for shaping the negative electrode is not particularly limited, and a publicly-known method can be applied thereto.

More specifically, for example, a negative electrode plate is obtained by preparing a negative electrode material composition containing the negative electrode active material containing the silicon nanoparticle-containing hydrogen polysilsesquioxane calcined product or the silicon nanoparticle-containing hydrogen polysilsesquioxane calcined product complexed with the carbon-based material, and the binder, and when necessary, a conductive material and the like, and directly coating the resulting material on the collector in a rod-like body, a plate-like body, a foil-like body, a net-like body or the like mainly containing copper, nickel, stainless steel or the like, or separately casting the negative electrode material composition on a support, and laminating a negative electrode active material film peeled from the support on the collector. Moreover, the negative electrode of the invention is not limited to the forms cited above, and can also be obtained in a form other than the forms cited.

As the binder, any binder can be used as long as the agent is generally used in the secondary battery, and has a functional group such as the $COO^-$ group having interaction with the Si—H bond on the negative electrode active material. Specific examples thereof include carboxymethylcellulose, polyacrylic acid, alginic acid, glucomannan, amylose, saccharose, and a derivative or a polymer thereof, and further an alkali metal salt thereof, and also a polyimide resin and a polyimideamide resin. The binders may be used alone, or in the form of a mixture thereof. Furthermore, a component providing the agent with another function such as improvement in binding properties with the collector, improvement in dispersibility and improvement in conductivity of the binder itself, for example, a styrene-butadiene rubber-based polymer or a styrene isoprene rubber-based polymer may be added and mixed.

Lithium ion battery

The lithium ion battery using the negative electrode active material formed by containing the silicon nanoparticle-containing hydrogen polysilsesquioxane calcined product of the invention can be produced as described below.

First, a positive electrode active material that can reversibly intercalate and deintercalate a lithium ion, a conductive aid, a binder and a solvent are mixed to arrange a positive electrode active material composition. In a manner similar to the negative electrode, according to a publicly known method, the positive electrode active material composition is directly coated on a metal collector and dried to arrange a positive electrode plate.

A positive electrode can also be prepared by separately casting the positive electrode active material composition on the support, and then laminating the film peeled from the support on the metal collector. A method for shaping the positive electrode is not particularly limited, and a publicly-known method can be applied thereto.

The positive electrode active material is not particularly limited as long as the material is lithium metal complex oxide, and is generally used in a field of the secondary battery. Specific examples include lithium cobalt oxide, lithium nickel oxide, lithium manganese oxide having a spinel structure, lithium cobalt manganese oxide, iron phosphate having an olivine structure, so-called ternary lithium metal complex oxide and nickel-based lithium metal complex oxide. Moreover, $V_2O_5$, TiS, MoS and the like, being a compound allowing release and intercalation of the lithium ion, can also be used.

The conductive aid is not particularly limited as long as the aid is generally used in the lithium ion battery, and an electron conductive material causing no decomposition or no deterioration in the configured battery may be applied. Specific examples include carbon black (such as acetylene black), graphite fine particles, vapor growth carbon fibers and a combination of two or more kinds thereof. Moreover, specific examples of the binder include a vinylidene fluoride-hexafluoropropylene copolymer, polyvinylidene fluoride (PVDF), polyacrylonitrile, polymethylmethacrylate, polytetrafluoroethylene and a mixture thereof, and a styrene-butadiene rubber-based polymer, but not limited thereto. In addition, specific examples of the solvent include N-methyl pyrrolidone, acetone and water, but not limited thereto.

On the occasion, a content of the positive electrode active material, the conductive aid, the binder and the solvent is specified to be an amount which can be generally used in the lithium ion battery.

A separator to be interposed between the positive electrode and the negative electrode is not particularly limited as long as the separator is generally used in the lithium ion battery. A material having low resistance to ion migration of an electrolyte, or excellent electrolyte impregnating ability is preferred. Specific examples include a material selected from glass fibers, polyester, polyethylene, polypropylene, polytetrafluoroethylene, polyimide or a compound thereof, and the material may be in the form of a nonwoven fabric or a woven fabric.

More specifically, in the case of the lithium ion battery, a windable separator composed of a material such as polyethylene and polypropylene is preferably used, and in the case of a lithium ion polymer battery, a separator having excellent organic electrolyte impregnating ability is preferably used.

As the electrolyte, one kind or a mixture of two or more kinds of electrolytes including a lithium salt such as lithium hexafluorophosphate, lithium tetrafluoroborate, lithium hexaantimony, lithium hexafluoroarsenate, lithium perchlorate, lithium trifluoromethanesulfonate, Li $(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where, x and y are a natural number), LiCl and LiI is dissolved in a solvent such as propylene carbonate, ethylene carbonate, dimethyl carbonate, diethyl carbonate, ethyl methyl carbonate, methyl propyl carbonate, butylene carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene or diethyl ether or a mixed solvent thereof, and the resulting material can be used.

Moreover, various other nonaqueous electrolytes or solid electrolytes can also be used. For example, various ionic liquids to which a lithium ion is added, a quasi-solid electrolyte in which the ionic liquid and fine powder are mixed, a lithium ion conductive solid electrolyte, or the like can be used.

Furthermore, for the purpose of improving charging and discharging cycle performance, a compound that promotes stable film formation on a surface of the negative electrode active material can be appropriately incorporated into the electrolyte described above. For example, such fluorinated carbonate is effective as vinylene carbonate (VC), fluorobenzene, cyclic fluorinated carbonate (such as fluoroethylene carbonate (FEC), trifluoropropylene carbonate (TFPC)), or chain fluorinated carbonate (such as trifluorodimethyl carbonate (TFDMC), trifluorodiethyl carbonate (TFDEC) and trifluoroethyl methyl carbonate (TFEMC)). In addition, the cyclic fluorinated carbonate and the chain fluorinated carbonate can also be used as the solvent, such as ethylene carbonate.

The separator is disposed between the positive electrode plate and the negative electrode plate as described above to form a battery structure. If such a battery structure is wound or folded into a cylindrical battery case or a square battery case, and then the electrolyte is injected thereto, the lithium ion battery is completed.

Moreover, if the battery structures are laminated into a bicell structure, and then the resulting material is impregnated into an organic electrolyte, and the thus obtained material is put into a pouch and sealed, the lithium ion polymer battery is completed.

Figure 3:
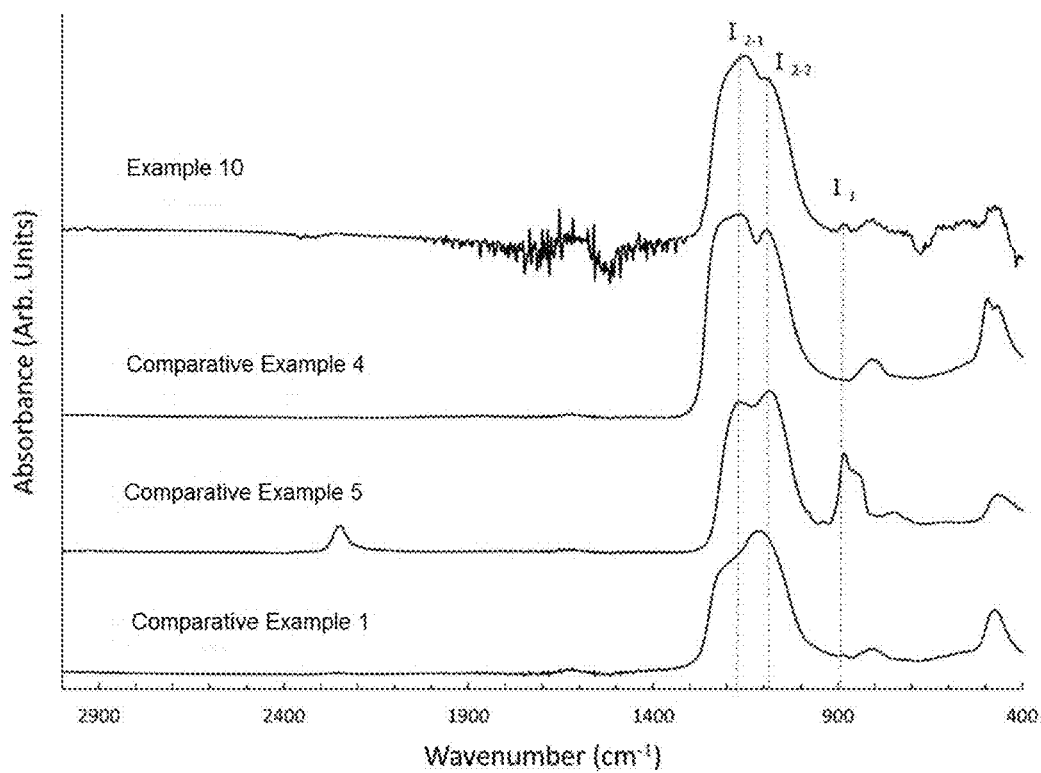
FIG. 3 is a chart of an IR absorption spectrum of silicon nanoparticle-containing hydrogen polysilsesquioxane calcined product (5) produced in Example 10, silicon nanoparticle-containing hydrogen polysilsesquioxane calcined product (8) produced in Comparative Example 4, silicon nanoparticle-containing hydrogen polysilsesquioxane calcined product (9) produced in Comparative Example 5, and silicon nanoparticle mixed silicon oxide (1) produced in Comparative Example 1, by infrared spectroscopy (IR).

In the invention, one aspect of the silicon nanoparticle-containing hydrogen polysilsesquioxane calcined product formed by heat-treating silicon nanoparticle-containing hydrogen polysilsesquioxane is the silicon nanoparticle-containing hydrogen polysilsesquioxane calcined product in which, in the spectrum measured by infrared spectroscopy, the ratio ($I_1/I_2$) of intensity ($I_1$) of peak 1 in 820 to 920 cm$^{-1}$ arising from the Si—H bond to intensity ($I_2$) of peak 2 in 1000 to 1200 cm$^{-1}$ arising from the Si—O—Si bond is in the range of 0.01 to 0.35, as shown in FIG. 3, and is represented by general formula $SiO_{x2}H_{y2}$ ($0.3<x2<1.5$, $0.01<y2<0.35$), as shown in elemental analysis values in Table 1, in comparison with conventional general silicon oxide. The lithium ion battery produced by using the negative electrode active material containing the silicon nanoparticle-containing hydrogen polysilsesquioxane calcined product having the above futures exhibits the high capacity, the good initial charging and discharging efficiency and excellent cycle performance.

In one aspect of the silicon nanoparticle-containing hydrogen polysilsesquioxane calcined product of the invention, the calcined product has features in which, in the spectrum measured by infrared spectroscopy, among the peaks arising from Si—O—Si, the ratio ($I_{2-1}/I_{2-2}$) of intensity ($I_{2-1}$) of peak 2-1 at about 1170 cm$^{-1}$ to intensity ($I_{2-2}$) of peak 2-2 at about 1070 cm$^{-1}$ is more than 1. The above features are similar to the features of silicon nanoparticle-containing hydrogen polysilsesquioxane as a precursor. Moreover, the proportion of the cyclized bond is substantially maintained also after the heat treatment, and therefore a state of $I_{2-1}/I_{2-2}>1$ is also maintained.

In such a silicon nanoparticle-containing hydrogen polysilsesquioxane calcined product, the surface of the silicon nanoparticles and the silicon oxide structure (derived from hydrogen polysilsesquioxane) are suggested to form a network through the strong chemical bond (Si—O—Si bond). The network is held even after the calcination, and a skeleton of a part of the silicon oxide structure plays a role of a buffer layer against expansion and contraction of the silicon nanoparticles, and as a result, micronization of the silicon nanoparticles caused upon repeating charge and discharge is estimated to be suppressed.

EXAMPLES

Hereinafter, the invention will be described more specifically by describing Examples and Comparative Examples, but the invention is not limited to the Examples.

Various analyses and evaluations were conducted on several of samples prepared in Examples and Comparative Examples.

A measuring device and a measuring method for "measurement by infrared spectroscopy" and "measurement by an elemental analysis" and "evaluation of battery characteristics" in each Example and Comparative Example are as described below.

(Measurement by Infrared Spectroscopy)

With regard to measurement by infrared spectroscopy, measurement was carried out by using Nicolet iS5 FT-IR made by Thermo Fisher Scientific Inc. as an infrared spectrometer, in measurement of transmission by a KBr method (resolution: 4 cm$^{-1}$, the number of times of scans: 16 times, data interval: 1.928 cm$^{-1}$, detector: DTGS KBr) on intensity ($I_2$) of peak 2 in 1000 to 1200 cm$^{-1}$ arising from a Si—O—Si bond. In addition, each peak intensity was determined by connecting a starting point and an end point of a target peak by a straight line, partially correcting a baseline, and then measuring a height from the baseline to a peak top. Peaks arising from the Si—O—Si bond existed in two places, and therefore the peaks were separated, and intensity of the peak at about 1170 cm$^{-1}$ was specified as $I_{2-1}$, and intensity of the peak at about 1070 cm$^{-1}$ was specified as $I_{2-2}$, and intensity of the peak having higher intensity of the two peaks was specified as $I_2$.

(Elemental Analysis)

An elemental composition analysis was conducted by compacting sample powder into a pellet form, and then irradiating the sample with a He ion accelerated to 2.3 MeV and applying a Rutherford back scattering spectrometry (RBS)-hydrogen forward scattering spectrometry (HFS) method according to which a high-accuracy composition value including hydrogen is obtained by analyzing an energy spectrum of back scattered particles and an energy spectrum of a forward scattered hydrogen atom. Measurement was carried out under conditions of incident ion: 2.3 MeV He, incident angle during RBS/HFS simultaneous measurement: 75 degrees, scattering angle: 160 degrees, sample current: 4 nA and beam diameter: 2 mmφ by using a measuring device Pelletron 3SDH made by National Electrostatics Corporation.

(Evaluation of Battery Characteristics)

A lithium ion battery was prepared by using a negative electrode active material containing a sample in predetermined Example or Comparative Example, and charging and discharging characteristics of the battery were measured as described below.

Constant current charge was carried out on a Li electrode at a current of 100 mA per 1 g of a silicon nanoparticle-containing hydrogen polysilsesquioxane calcined product until voltage reached 0.001 V by using BTS 2005W made by NAGANO & Co., Ltd., and then constant voltage charge was carried out while maintaining a voltage of 0.001 V until current reached a current value equal to or less than 20 mA per 1 g of an active material.

After elapse of an idle period of about 30 minutes, constant current discharge was carried out on a completely charged cell at a current of 100 mA per 1 g of an active material until voltage reached 1.5 V.

Moreover, charging capacity was calculated from an integral current value until the constant voltage charge was ended, and discharging capacity was calculated from an integral current value until a battery voltage reached 1.5 V, and a value obtained by dividing first discharging capacity by first charging capacity, and expressing the obtained value in terms of percentage was taken as initial charging and discharging efficiency. During switching between charge and discharge for each, an open circuit was rested for 30 minutes.

Charging and discharging cycle performance was also measured under similar conditions.

In addition, the charging and discharging efficiency was taken as a ratio of the discharging capacity to the first charging capacity (the first cycle of charge and discharge), and a capacity maintenance rate was taken as a ratio of discharging capacity at the 50th cycle of charge and discharge to the first discharging capacity.

Example 1

(Preparation of silicon nanoparticle-containing hydrogen polysilsesquioxane powder (1))

In a 50 mL beaker, 20 g of pure water and 1.92 g of silicon nanopowder (Sigma-Aldrich, less than 100 nm (volume-basis mean particle size, in which the size was more than 10 nm)) were put to prepare a silicon nanoparticle dispersed aqueous solution by using an ultrasonic cleaning bath. Into a 500 mL three-neck flask, the silicon nanoparticle dispersed liquid, 2.43 g (24 mmol) of 36 wt % (concentration) hydrochloric acid, and 218.6 g of pure water were charged, and the resulting mixture was stirred at room temperature for 10 minutes to wholly disperse silicon nanoparticles thereinto, and 45 g (274 mmol) of triethoxysilane (made by Tokyo Chemical Industry Co., Ltd.) was added dropwise thereto at 25° C. under stirring. After completion of dropwise addition, a hydrolysis reaction and a condensation reaction were carried out at 25° C. for 2 hours while the mixture was stirred.

After elapse of a reaction time, a reactant was filtrated by a membrane filter (pore size: 0.45 micrometer, hydrophilic) to collect a solid. The solid obtained was dried under reduced pressure at 80° C. for 10 hours to obtain 16.4 g of silicon nanoparticle-containing hydrogen polysilsesquioxane powder (1) (Example 1).

Example 2

(Preparation of Silicon Nanoparticle-Containing Hydrogen Polysilsesquioxane Calcined Product (1))

On an alumina boat of an SSA-S grade, 10.0 g of silicon nanoparticle-containing hydrogen polysilsesquioxane powder (1) in Example 1 was placed, and then the boat was set in a vacuum purging tube furnace KTF43N1-VPS (made by Koyo Thermo Systems Co., Ltd.). Then, as heat treatment conditions, while an argon gas was fed at a flow rate of 250 mL per minute under an argon gas atmosphere (high-purity argon gas: 99.999%), and temperature was raised at a rate of 4° C. per minute, and calcination was carried out at 900° C. for 1 hour to obtain a silicon nanoparticle-containing hydrogen polysilsesquioxane calcined product.

Then, the silicon nanoparticle-containing hydrogen polysilsesquioxane calcined product obtained was disintegrated and crushed with a mortar for 5 minutes, and the resulting material was classified using a stainless steel sieve having an opening of 32 micrometers to obtain 9.58 g of silicon nanoparticle-containing hydrogen polysilsesquioxane calcined product (1) having a maximum particle size of 32 micrometers.

(Preparation of a Negative Electrode)

To 20 g of a 2 wt % aqueous solution of carboxymethylcellulose, 3.2 g of silicon nanoparticle-containing hydrogen polysilsesquioxane calcined product (1) and 0.4 g of acetylene black made by Denka Company Limited were added. The resulting mixture was mixed for 15 minutes using a stirring bar in the flask, and then distilled water was added to be 15% by weight in a solid content concentration, and the resulting mixture was further stirred for 15 minutes to prepare a slurry composition. The slurry composition was transferred to a thin-film spin system high-speed mixer (FILMIX Model 40-40) made by PRIMIX Corporation, and was stirred and dispersed at a revolution speed of 20 m/s for 30 seconds. The slurry after dispersion treatment was coated on a copper foil roll at a thickness of 200 micrometers by a doctor blade method.

After coating, the resulting material was dried for 90 minutes on a hot plate at 80° C. After drying, a negative electrode sheet was pressed by a 2 ton small precision roll press (made by THANK-METAL Co., LTD.). After pressing, an electrode was punched by a 14.50 mmφ electrode punch HSNG-EP, and was dried under reduced pressure at 80° C. for 16 hours in a glass tube oven GTO-200 (SIBATA) to prepare a negative electrode.

(Preparation and evaluation of a lithium ion battery)

Figure 5:
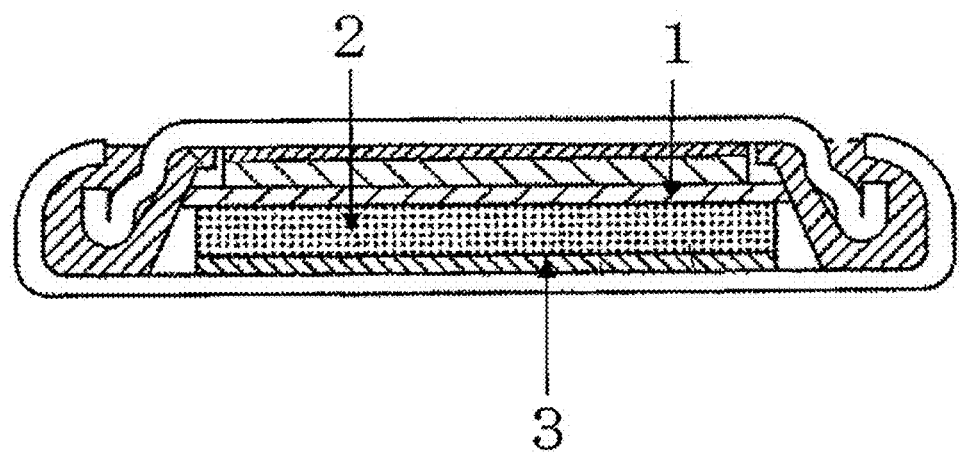
FIG. 5 is a diagram showing a configuration example of a coin-type lithium ion battery.

A 2032 type coin battery having a structure shown in FIG. 5 was prepared. The negative electrode body, lithium metal and a microporous polypropylene film were used as negative electrode 1, counter electrode 3 and separator 2, respectively. A material prepared by adding 5% by weight of fluoroethylene carbonate to a 1:1 (volume ratio) mixed solvent of ethylene carbonate and diethyl carbonate, as prepared by dissolving $LiPF_6$ at a rate of 1 mol/L was used as an electrolyte.

Then, battery characteristics of the lithium ion battery were evaluated by the method described above.

Example 3

(Preparation of silicon nanoparticle-containing hydrogen polysilsesquioxane powder (2))

In a 50 mL beaker, 200 g of pure water and 19.2 g of silicon nanopowder (Sigma-Aldrich, less than 100 nm (volume-basis mean particle size, in which the particle size was more than 10 nm)) were put to prepare a silicon nanoparticle dispersed aqueous solution by using an ultrasonic cleaning bath. Into a 3 L separable flask, the silicon nanoparticle dispersed liquid, 12.2 g (120 mmol) of 36 wt % (concentration) hydrochloric acid, and 0.94 kg of pure water were charged, and the resulting mixture was stirred at room temperature for 10 minutes to wholly disperse silicon nanoparticles thereinto, and 167 g (1.37 mol) of triethoxysilane (made by Tokyo Chemical Industry Co., Ltd.) was added dropwise thereto at 25° C. under stirring.

After completion of dropwise addition, a hydrolysis reaction and a condensation reaction were carried out at 25° C. for 2 hours while the mixture was stirred.

After elapse of a reaction time, a reactant was filtrated by a membrane filter (pore size: 0.45 micrometer, hydrophilic) to collect a solid. The solid obtained was dried under reduced pressure at 80° C. for 10 hours to obtain 95.2 g of silicon nanoparticle-containing hydrogen polysilsesquioxane powder (2) (Example 3).

Example 4

(Preparation of Silicon Nanoparticle-Containing Hydrogen Polysilsesquioxane Calcined Product (2))

Silicon nanoparticle-containing hydrogen polysilsesquioxane calcined product (2) was prepared by using silicon nanoparticle-containing hydrogen polysilsesquioxane powder (2) in Example 3 in a manner similar to Example 2.
(Preparation of a Negative Electrode, and Preparation and Evaluation of a Lithium Ion Battery)

A negative electrode body was prepared by using silicon nanoparticle-containing hydrogen polysilsesquioxane calcined product (2) obtained in a manner similar to Example 2 in which silicon nanoparticle-containing hydrogen polysilsesquioxane calcined product (1) was used, and battery characteristics of a lithium ion battery having the negative electrode body were evaluated.

Example 5

(Preparation of Silicon Nanoparticle-Containing Hydrogen Polysilsesquioxane Powder (3))

Then, 153 g of silicon nanoparticle-containing hydrogen polysilsesquioxane powder (3) (Example 5) was obtained by carrying out preparation in a manner similar to Example 3 except that a charging amount of silicon nanopowder (Sigma-Aldrich, less than 100 nm (volume-basis mean particle size, in which the particle size was more than 10 nm)) was changed to 77.0 g in preparation of silicon nanoparticle-containing hydrogen polysilsesquioxane.

An infrared spectroscopy spectrum of silicon nanoparticle-containing hydrogen polysilsesquioxane powder (3) obtained, and a photograph by an electron microscope (SEM) are shown in FIG. 1 and FIG. 2, respectively.

Example 6

(Preparation of Silicon Nanoparticle-Containing Hydrogen Polysilsesquioxane Calcined Product (3))

Silicon nanoparticle-containing hydrogen polysilsesquioxane calcined product (3) was prepared by using silicon nanoparticle-containing hydrogen polysilsesquioxane powder (3) in Example 5 in a manner similar to Example 2.
(Preparation of a Negative Electrode, and Preparation and Evaluation of a Lithium Ion Battery)

A negative electrode was prepared by using silicon nanoparticle-containing hydrogen polysilsesquioxane calcined product (3) obtained in a manner similar to Example 2 in which silicon nanoparticle-containing hydrogen polysilsesquioxane calcined product (1) was used, and battery characteristics of a lithium ion battery having the negative electrode were evaluated.

Example 7

(Preparation of Silicon nanoparticle-containing hydrogen polysilsesquioxane powder (4))

Then, 95.4 g of silicon nanoparticle-containing hydrogen polysilsesquioxane powder (4) (Example 7) was obtained by carrying out preparation in a manner similar to Example 5 except that, as a condensation catalyst, 7.2 g (120 mmol) of acetic acid (a Wako guaranteed reagent) was used in place of 12.2 g (120 mmol) of 36 wt % (concentration) hydrochloric acid, in preparation of silicon nanoparticle-containing hydrogen polysilsesquioxane.

Example 8

(Preparation of silicon nanoparticle-containing hydrogen polysilsesquioxane calcined product (4))

Silicon nanoparticle-containing hydrogen polysilsesquioxane calcined product (4) was prepared by using silicon nanoparticle-containing hydrogen polysilsesquioxane powder (4) in Example 7 in a manner similar to Example 2.
(Preparation of a Negative Electrode, and Preparation and Evaluation of a Lithium Ion Battery)

A negative electrode body was prepared by using silicon nanoparticle-containing hydrogen polysilsesquioxane calcined product (4) obtained in a manner similar to Example 2 in which silicon nanoparticle-containing hydrogen polysilsesquioxane calcined product (1) was used, and battery characteristics of a lithium ion battery having the negative electrode body were evaluated.

Example 9

(Preparation of Silicon Nanoparticle-Containing Hydrogen Polysilsesquioxane Powder (5))

In a 100 mL beaker, 50 g of pure water and 6.63 g of silicon nanopowder (Sigma-Aldrich, less than 100 nm (volume-basis mean particle size, in which the particle size was more than 10 nm)) were put to prepare a silicon nanoparticle dispersed aqueous solution by using an ultrasonic cleaning bath. Into a 500 mL three-neck flask, the silicon nanoparticle dispersed liquid and 46 g of pure water were charged, and the resulting mixture was stirred for 10 minutes, and then an inside of the flask was replaced by nitrogen. Then, 16.0 g (118 mmol) of trichlorosilane was added dropwise thereto at 20° C. under stirring while the mixture in the flask was ice-cooled. After completion of dropwise addition, a hydrolysis reaction and a condensation reaction were carried out at 20° C. for 2 hours while the mixture was stirred.

After elapse of a reaction time, a reactant was filtrated using a membrane filter (pore size: 0.45 micrometer, hydrophilic) to collect a solid. The solid obtained was dried under reduced pressure at 80° C. for 10 hours to obtain 12.6 g of silicon nanoparticle-containing hydrogen polysilsesquioxane powder (5) (Example 9).

Example 10

(Preparation of Silicon Nanoparticle-Containing Hydrogen Polysilsesquioxane Calcined Product (5))

Silicon nanoparticle-containing hydrogen polysilsesquioxane calcined product (5) was prepared by using silicon nanoparticle-containing hydrogen polysilsesquioxane powder (5) in Example 9 in a manner similar to Example 2.
(Preparation of a Negative Electrode, and Preparation and Evaluation of a Lithium Ion Battery)

A negative electrode was prepared by using silicon nanoparticle-containing hydrogen polysilsesquioxane calcined product (5) obtained in a manner similar to Example 2 in which silicon nanoparticle-containing hydrogen polysilsesquioxane calcined product (1) was used, and battery characteristics of a lithium ion battery having the negative electrode were evaluated. An infrared spectroscopy spectrum of silicon nanoparticle-containing hydrogen polysilsesquioxane powder (5) (Example 10) obtained, and a photograph by an electron microscope (SEM) are shown in FIG. 3 and FIG. 4, respectively.

Example 11

(Preparation of Silicon Nanoparticle-Containing Hydrogen Polysilsesquioxane Calcined Product (6))

Then, 9.83 g of silicon nanoparticle-containing hydrogen polysilsesquioxane powder (6) was obtained in a manner similar to Example 2 except that 10.0 g of silicon nanoparticle-containing hydrogen polysilsesquioxane calcined product (5) was used, and an argon-hydrogen mixed gas (hydrogen gas concentration: 10% by volume) was used as a feed gas.

(Preparation of a Negative Electrode, and Preparation and Evaluation of a Lithium Ion Battery)

A negative electrode body was prepared by using silicon nanoparticle-containing hydrogen polysilsesquioxane calcined product (6) obtained in a manner similar to Example 2 in which silicon nanoparticle-containing hydrogen polysilsesquioxane calcined product (1) was used, and battery characteristics of a lithium ion secondary battery having the negative electrode body were evaluated.

Example 12

(Preparation of Silicon Nanoparticle-Containing Hydrogen Polysilsesquioxane Calcined Product (7))

Then, 9.81 g of silicon nanoparticle-containing hydrogen polysilsesquioxane powder (7) was obtained by preparing a calcined product in a manner similar to Example 2 except that 10.0 g of silicon nanoparticle-containing hydrogen polysilsesquioxane calcined product (5) was used, and a calcination temperature was adjusted to 800° C.

(Preparation of a Negative Electrode, and Preparation and Evaluation of a Lithium Ion Battery)

A negative electrode body was prepared by using silicon nanoparticle-containing hydrogen polysilsesquioxane calcined product (7) obtained in a manner similar to Example 2 in which silicon nanoparticle-containing hydrogen polysilsesquioxane calcined product (1) was used, and battery characteristics of a lithium ion secondary battery having the negative electrode body were evaluated.

Comparative Example 1

(Preparation of Silicon Nanoparticle Composite Silicon Oxide (1))

Silicon monoxide powder having a maximum particle size of 20 micrometers was obtained by classifying commercially available silicon monoxide (made by Sigma-Aldrich Co. LLC., under 325 mesh) by using a stainless steel sieve having an opening of 20 micrometers. Then, 10.0 g of the silicon monoxide having 20 micrometers or less was mixed with 6.37 g of silicon nanopowder (Sigma-Aldrich Co. LLC., volume-basis mean particle size<100 nm (less than 100 nm)) by ball milling treatment by a planetary ball mill using a zirconia vessel and a zirconia ball for 10 minutes to obtain silicon nanoparticle mixed silicon oxide (1). An infrared spectroscopy spectrum of silicon nanoparticle mixed silicon oxide (1) obtained is shown in FIG. 3 (represented as Comparative Example 1 in FIG. 3). Then, a 2 wt % aqueous solution of carboxymethylcellulose was added to silicon nanoparticle mixed silicon oxide (1), and ball milling treatment was carried out by a planetary ball mill using a zirconia vessel and a zirconia ball for 2 hours, and the resulting material was dried by a vacuum dryer at 100° C. for 8 hours to remove water to obtain silicon nanoparticle composite silicon oxide (1) (Comparative Example 1).

(Preparation of a Negative Electrode)

A negative electrode body was prepared in a manner similar to Example 2 except that silicon nanoparticle composite silicon oxide (1) in Comparative Example 1 was used.

(Preparation and evaluation of a lithium ion battery)

A lithium ion battery was prepared in a manner similar to Example 2 in which silicon nanoparticle-containing hydrogen polysilsesquioxane calcined product (1) was used except that the negative electrode prepared from silicon nanoparticle composite silicon oxide (1) was used, and characteristics of the battery were evaluated.

Comparative Example 2

(Preparation of Hydrogen Silsesquioxane Polymer (1))

Into a 3 L separable flask, 12.2 g (120 mmol) of 36 wt % (concentration) hydrochloric acid and 1.19 kg of pure water were charged, and 167 g (1.37 mol) of trimethoxysilane (made by Tokyo Chemical Industry Co., Ltd) was added dropwise thereto at 25° C. under stirring. After completion of dropwise addition, a hydrolysis reaction and a condensation reaction were carried out at 25° for 2 hours while the mixture was stirred.

After elapse of a reaction time, a reactant was filtrated by a membrane filter (pore size: 0.45 micrometer, hydrophilic) to collect a solid. The solid obtained was dried under reduced pressure at 80° C. for 10 hours to obtain 76.0 g of hydrogen silsesquioxane polymer (1) (Comparative Example 2).

Comparative Example 3

(Preparation of Hydrogen Silsesquioxane Polymer Calcined Product (1))

Hydrogen silsesquioxane polymer calcined product (1) was prepared using hydrogen silsesquioxane polymer (1) in Comparative Example 2 in a manner similar to Example 2.

(Preparation of a Negative Electrode, and Preparation and Evaluation of a Lithium Ion Battery)

A negative electrode was prepared using hydrogen silsesquioxane polymer calcined product (1) obtained in a manner similar to Example 2 in which silicon nanoparticle-containing hydrogen polysilsesquioxane calcined product (1) was used, and battery characteristics of a lithium ion battery having the negative electrode were evaluated.

Comparative Example 4

(Preparation of Silicon Nanoparticle-Containing Hydrogen Polysilsesquioxane Calcined Product (8))

Silicon nanoparticle-containing hydrogen polysilsesquioxane calcined product (8) was obtained in a manner similar to Example 2 except that a calcination temperature in heat treatment was adjusted to 1100° C. in preparation of a calcined product.

The results of infrared spectrometry measurement of silicon nanoparticle-containing hydrogen polysilsesquioxane calcined product (8) (Comparative Example 4) obtained are shown in FIG. 3.

(Preparation of a Negative Electrode Body)

A negative electrode was prepared in a manner similar to Example 2 in which silicon nanoparticle-containing hydrogen polysilsesquioxane calcined product (1) was used except that silicon nanoparticle-containing hydrogen polysilsesquioxane calcined product (8) was used.

(Preparation and Evaluation of a Lithium Ion Secondary Battery)

A lithium ion secondary battery was prepared in a manner similar to Example 1 except that the negative electrode body prepared from silicon nanoparticle-containing hydrogen polysilsesquioxane calcined product (8) was used as a negative electrode body, and battery characteristics were evaluated.

Comparative Example 5

(Preparation of Silicon Nanoparticle-Containing Hydrogen Polysilsesquioxane Calcined Product (9))

Silicon nanoparticle-containing hydrogen polysilsesquioxane calcined product (9) was obtained in a manner similar to Example 2 except that a calcination temperature in heat treatment was adjusted to 500° C. in preparation of a calcined product.

The results of infrared spectrometry measurement of silicon nanoparticle-containing hydrogen polysilsesquioxane calcined product (9) (Comparative Example 5) obtained are shown in FIG. 3.

(Preparation of a Negative Electrode Body, and Preparation and Evaluation of a Lithium Ion Battery)

A Lithium ion secondary battery was prepared in a manner similar to Example 2 in which silicon nanoparticle-containing hydrogen polysilsesquioxane calcined product (1) was used except that silicon nanoparticle-containing hydrogen polysilsesquioxane calcined product (9) was used, and battery characteristics were evaluated.

According to the results of each Example described above, all of the negative electrode active materials for the lithium ion batteries, which were prepared from the calcined product obtained by heat-treating silicon nanoparticle-containing hydrogen polysilsesquioxane having a new structure having a suitable amount of Si—Si bond used in the invention and having a chemical bond between a surface of silicon nanoparticles and hydrogen polysilsesquioxane, had remarkably higher discharging capacity in both initial discharging capacity and discharging capacity at the 50th cycle, and better initial charging and discharging capacity, smaller capacity reduction by a charging and discharging cycle, and a higher capacity maintenance rate than a conventional carbon-based negative electrode material has. Accordingly, specific silicon nanoparticle-containing hydrogen polysilsesquioxane can be evaluated as a useful compound which can sufficiently withstand practical use as a lithium ion battery negative electrode active material by applying the heat treatment thereto, and can be a material usable as a negative electrode material for the latest battery in which high capacity is required.

As shown in Comparative Example 1, the characteristics of the battery adopting the negative electrode using the negative electrode active material prepared from the silicon oxide having no chemical bond on a surface of the silicon nanoparticles and having no Si—H bond, when compared with the characteristics of the battery prepared under the same conditions as in the negative electrode adopting the negative electrode active material of the invention, do not reach a practical level as the lithium ion battery because, while the initial charging and discharging efficiency exhibits a certain level of value, the capacity is rapidly reduced.

The calcined product of hydrogen polysilsesquioxane containing no silicon nanoparticles in Comparative Example 3 (the calcined product in Comparative Example 2) is not the new structure having the chemical bond between the surface of the silicon nanoparticles and a silicon oxide structure derived from hydrogen polysilsesquioxane. Therefore, in the infrared spectroscopy spectrum, among the peaks arising from Si—O—Si, a ratio ($I_{2-1}/I_{2-2}$) of intensity ($I_{2-1}$) of peak 2-1 at about 1170 cm$^{-1}$ to intensity ($I_{2-2}$) of peak 2-2 at about 1070 cm$^{-1}$ is not more than 1. The characteristics of the thus obtained battery adopting the negative electrode using the negative electrode active material prepared from the silicon

TABLE 1

| | Elemental analysis (mole ratio) | | | IR peak ratio |
|---|---|---|---|---|
| | Si | O | H | $I_{2-1}/I_{2-2}$ |
| Example 1 | 1.00 | 1.21 | 0.82 | 1.08 |
| Example 3 | 1.00 | 1.02 | 0.67 | 1.15 |
| Example 5 | 1.00 | 0.50 | 0.32 | 1.22 |
| Example 7 | 1.00 | 0.51 | 0.34 | 1.25 |
| Example 9 | 1.00 | 0 52 | 0.33 | 1.23 |
| Comparative Example 1 | 1.00 | 0.50 | 0.00 | 0.77 |
| Comparative Example 2 | 1.00 | 1.51 | 1.01 | 0.84 |

TABLE 2

| | Calcination Temperature | Elemental analysis (mole ratio) | | | IR peak ratio | | Initial charging capacity | Initial discharging capacity | Initial charging and discharging efficiency | Discharging capacity at 50th cycle | Capacity maintenance rate |
|---|---|---|---|---|---|---|---|---|---|---|---|
| | ° C. | Si | O | H | $I_1/I_2$ | $I_{2-1}/I_{2-2}$ | mAh/g | mAh/g | % | mAh/g | % |
| Example 2 | 900 | 1.00 | 1.22 | 0.08 | 0.05 | 1.2 | 1920 | 1315 | 68.5 | 1230 | 93.5 |
| Example 4 | 900 | 1.00 | 1.03 | 0.09 | 0.06 | 1.15 | 2030 | 1482 | 73.0 | 1372 | 92.6 |
| Example 6 | 900 | 1.00 | 0.50 | 0.10 | 0.05 | 1.18 | 2605 | 2201 | 84.5 | 2021 | 91.8 |
| Example 8 | 900 | 1.00 | 0.51 | 0.08 | 0.07 | 1.20 | 2560 | 2156 | 84.2 | 1985 | 92.1 |
| Example 10 | 900 | 1.00 | 0.52 | 0.07 | 0.04 | 1.15 | 2570 | 2161 | 84.1 | 2006 | 92.8 |
| Example 11 | 900 | 1.00 | 0.50 | 0.12 | 0.06 | 1.17 | 2592 | 2234 | 86.2 | 2062 | 92.3 |
| Example 12 | 800 | 1.00 | 0.51 | 0.15 | 0.13 | 1.10 | 2588 | 2195 | 84.8 | 2052 | 93.5 |
| Comparative Example 1 | — | 1.00 | 0.50 | 0 | 0.00 | 0.77 | 2550 | 2091 | 82.0 | 1361 | 65.1 |
| Comparative Example 3 | 900 | 1.00 | 1.51 | 0.05 | 0.04 | 0.68 | 1850 | 1101 | 59.5 | 1035 | 94.0 |
| Comparative Example 4 | 1100 | 1.00 | 0.51 | 0 | 0.00 | 1.14 | 455 | 366 | 80.5 | 362 | 98.8 |
| Comparative Example 5 | 500 | 1.00 | 0.50 | 0.45 | 0.45 | 1.01 | 2235 | 1538 | 68.8 | 1419 | 92.3 | oxide obtained by the method other than the invention and having no chemical bond with the surface of the silicon nanoparticles, when compared with the characteristics of the battery prepared under the same conditions as in the negative electrode adopting the negative electrode active material obtained in the invention, do not reach the practical level as the lithium ion battery because, while the initial charging and discharging efficiency exhibits a certain level of value, the capacity is rapidly reduced.

The silicon nanoparticle-containing hydrogen polysilsesquioxane calcined product calcined at a temperature more than 1000° C. shown in Comparative Example 4 does not have a suitable amount of Si—H bond, and the silicon nanoparticle-containing hydrogen polysilsesquioxane calcined product in Comparative Example 5 has an excessively large amount of Si—H bond, and therefore the characteristics of the batteries adopting the negative electrodes prepared from the above calcined products were poor in practical use because, while the cycle performance was favorable, first discharging capacity was significantly low.

INDUSTRIAL APPLICABILITY

A negative electrode active material for a lithium ion battery using a silicon nanoparticle-containing hydrogen polysilsesquioxane calcined product obtained by a production method of the invention is applied, and a negative electrode using the negative electrode active material is formed, and the resulting material is used for a lithium ion battery, thereby being able to obtain the lithium ion battery having remarkably higher capacity, in comparison with a conventional carbon-based negative electrode material, and having practical initial charging and discharging efficiency and cycle performance. For example, the invention is a useful technique in a field of a battery, particularly, in the field of a secondary battery.

What is claimed is:

1. A silicon nanoparticle-containing hydrogen polysilsesquioxane calcined product, represented by general formula $SiO_{x2}H_{y2}$ ($0.3<x2<1.5$, $0.01<y2<0.35$),
    containing 5% by weight to 65% by weight of silicon nanoparticles having a volume-basis mean particle size of more than 10 nanometers and less than 500 nanometers,
    having a chemical bond between a surface of the silicon nanoparticles and a silicon oxide structure derived from hydrogen polysilsesquioxane,
    having a Si—H bond, and
    substantially containing no carbon.

2. The silicon nanoparticle-containing hydrogen polysilsesquioxane calcined product according to claim 1, wherein, in a spectrum measured by infrared spectroscopy, a ratio ($I_1/I_2$) of intensity ($I_1$) of peak 1 in 820 to 920 cm$^{-1}$ arising from the Si—H bond to intensity ($I_2$) of peak 2 in 1000 to 1200 cm$^{-1}$ arising from a Si—O—Si bond is in the range of 0.01 to 0.35.

3. The silicon nanoparticle-containing hydrogen polysilsesquioxane calcined product according to claim 1, wherein, in a spectrum measured by infrared spectroscopy, among peaks arising from Si—O—Si, a ratio ($I_{2-1}/I_{2-2}$) of intensity ($I_{2-1}$) of a peak (peak 2-1) at about 1170 cm$^{-1}$ to intensity ($I_{2-2}$) of a peak (peak 2-2) at about 1070 cm$^{-1}$ is more than 1.

4. A negative electrode active material for a lithium ion battery, containing the silicon nanoparticle-containing hydrogen polysilsesquioxane calcined product according to claim 1.

5. A negative electrode for a lithium ion battery, containing the negative electrode active material for the lithium ion battery according to claim 4.

6. A lithium ion battery, having the negative electrode for the lithium ion battery according to claim 5.

7. A production method for a silicon nanoparticle-containing hydrogen polysilsesquioxane calcined product, represented by general formula $SiO_{x2}H_{y2}$ ($0.3<x2<1.5$, $0.01<y2<0.35$), containing 5% by weight to 65% by weight of silicon nanoparticles having a volume-basis mean particle size of more than 10 nanometers and less than 500 nanometers, having a chemical bond between a surface of the silicon nanoparticles and a silicon oxide structure derived from hydrogen polysilsesquioxane, having a Si—H bond, and substantially containing no carbon, and including a step of calcining silicon nanoparticle-containing hydrogen polysilsesquioxane, represented by general formula $SiO_{x1}H_{y1}$ ($0.25<x1<1.35$, $0.16<y1<0.90$), containing 5% by weight to 65% by weight of silicon nanoparticles having a volume-basis mean particle size of more than 10 nanometers and less than 500 nanometers, and having a chemical bond between a surface of the silicon nanoparticles and hydrogen polysilsesquioxane.

8. The production method according to claim 7, wherein, in a spectrum measured by infrared spectroscopy, a ratio ($I_1/I_2$) of intensity ($I_1$) of peak 1 in 820 to 920 cm$^{-1}$ arising from a Si—H bond to intensity ($I_2$) of peak 2 in 1000 to 1200 cm$^{-1}$ arising from a Si—O—Si bond is in the range of 0.01 to 0.35.

9. The production method according to claim 7, wherein, in a spectrum measured by infrared spectroscopy, among peaks arising from Si—O—Si, a ratio ($I_{2-1}/I_{2-2}$) of intensity ($I_{2-1}$) of a peak (peak 2-1) at about 1170 cm$^{-1}$ to intensity ($I_{2-2}$) of a peak (peak 2-2) at about 1070 cm$^1$ is more than 1.

10. The production method according to claim 7, wherein the calcination is performed at a temperature of 600° C. to 900° C. under a non-oxidizing atmosphere.

11. The production method according to claim 10, wherein the non-oxidizing atmosphere is a hydrogen gas atmosphere, or a mixed gas atmosphere of 2% by volume or more of a hydrogen gas and an inert gas.

12. A silicon nanoparticle-containing hydrogen polysilsesquioxane, represented by general formula $SiO_{x1}H_{y1}$ ($0.25<x1<1.35$, $0.16<y1<0.90$), containing 5% by weight to 65% by weight of silicon nanoparticles having a volume-basis mean particle size of more than 10 nanometers and less than 500 nanometers, and having a chemical bond between a surface of the silicon nanoparticles and hydrogen polysilsesquioxane.

13. The silicon nanoparticle-containing hydrogen polysilsesquioxane according to claim 12, wherein, in a spectrum measured by infrared spectroscopy, among peaks arising from Si—O—Si, a ratio ($I_{2-1}/I_{2-2}$) of intensity ($I_{2-1}$) of a peak (peak 2-1) at about 1170 cm$^{-1}$ to intensity ($I_{2-2}$) of a peak (peak 2-2) at about 1070 cm$^{-1}$ is more than 1.

14. A production method for silicon nanoparticle-containing hydrogen polysilsesquioxane, represented by general formula $SiO_{x1}H_{y1}$ ($0.25<x1<1.35$, $0.16<y1<0.90$), containing 5% by weight to 65% by weight of silicon nanoparticles having a volume-basis mean particle size of more than 10 nanometers and less than 500 nanometers, and having a chemical bond between a surface of the silicon nanoparticles and hydrogen polysilsesquioxane, and including a step of allowing hydrolysis and a condensation reaction of a silicon compound represented by formula (1) in the presence of silicon nanoparticles:

$$HSi(R)_3 \qquad (1)$$

wherein, R is halogen, hydrogen or a group selected from substituted or unsubstituted alkoxy having 1 to 10 carbons, substituted or unsubstituted aryloxy having 6 to 20 carbons, and substituted or unsubstituted arylalkoxy having 7 to 30 carbons, which is identical with or different from each other, in which, in the substituted or unsubstituted alkoxy having 1 to 10 carbons, the substituted or unsubstituted aryloxy having 6 to 20 carbons, and the substituted or unsubstituted arylalkoxy having 7 to 30 carbons, arbitrary hydrogen may be replaced by halogen.

* * * * *